United States Patent [19]

Hescher et al.

[11] Patent Number: 4,984,116
[45] Date of Patent: Jan. 8, 1991

[54] MAGNETIC SCANNING DEVICE FOR AN OBLIQUE-TRACK TAPE DECK

[75] Inventors: Manfred Hescher, Weiterstadt; Theo Wolf, Rossdorf, both of Fed. Rep. of Germany

[73] Assignee: BTS Broadcast Television Systems GmbH, Darmstadt, Fed. Rep. of Germany

[21] Appl. No.: 272,888

[22] PCT Filed: Feb. 3, 1988

[86] PCT No.: PCT/DE88/00052
§ 371 Date: Oct. 13, 1988
§ 102(e) Date: Oct. 13, 1988

[87] PCT Pub. No.: WO88/06782
PCT Pub. Date: Sep. 7, 1988

[30] Foreign Application Priority Data

Feb. 25, 1987 [DE] Fed. Rep. of Germany ....... 3705929

[51] Int. Cl.$^5$ .......................... G11B 5/56; G11B 5/53
[52] U.S. Cl. ........................................ 360/109; 360/84
[58] Field of Search ............ 360/107, 109, 104, 84–85, 360/95

[56] References Cited

U.S. PATENT DOCUMENTS

| 3,179,909 | 4/1965 | Cheney | 336/120 |
| 3,516,146 | 6/1968 | Maxey | 360/130.24 X |
| 3,995,317 | 11/1976 | Schmidt | 360/130.24 X |
| 4,080,639 | 3/1978 | Gunschmann | 360/107 |
| 4,156,261 | 5/1979 | Wolf | 360/109 |
| 4,564,876 | 1/1986 | Takahashi et al. | 360/107 |

FOREIGN PATENT DOCUMENTS

| 1930779 | 2/1970 | Fed. Rep. of Germany . |
| 3130801 | 2/1983 | Fed. Rep. of Germany . |
| 3244215 | 6/1983 | Fed. Rep. of Germany . |
| 0196457 | 3/1986 | Japan | 360/130.24 |

Primary Examiner—David J. Severin
Attorney, Agent, or Firm—Frishauf, Holtz, Goodman & Woodward

[57] ABSTRACT

To assure production of compatible magnetic tracks on magnetic tape, the head wheels of oblique-track tape decks must be height-adjustable. In conventional devices, adjustment of the head wheel height alters the pre-tensioning of the head wheel bearings or the length of the tape loop around the playback device must be chosen unnecessarily large. In the playback device of the present invention, the head wheel motor and head wheel form a unit which is axially shiftable. The pre-tensioning of the bearings is accomplished using a spring device which is supported against an element which rotates with the head wheel axle.

6 Claims, 1 Drawing Sheet

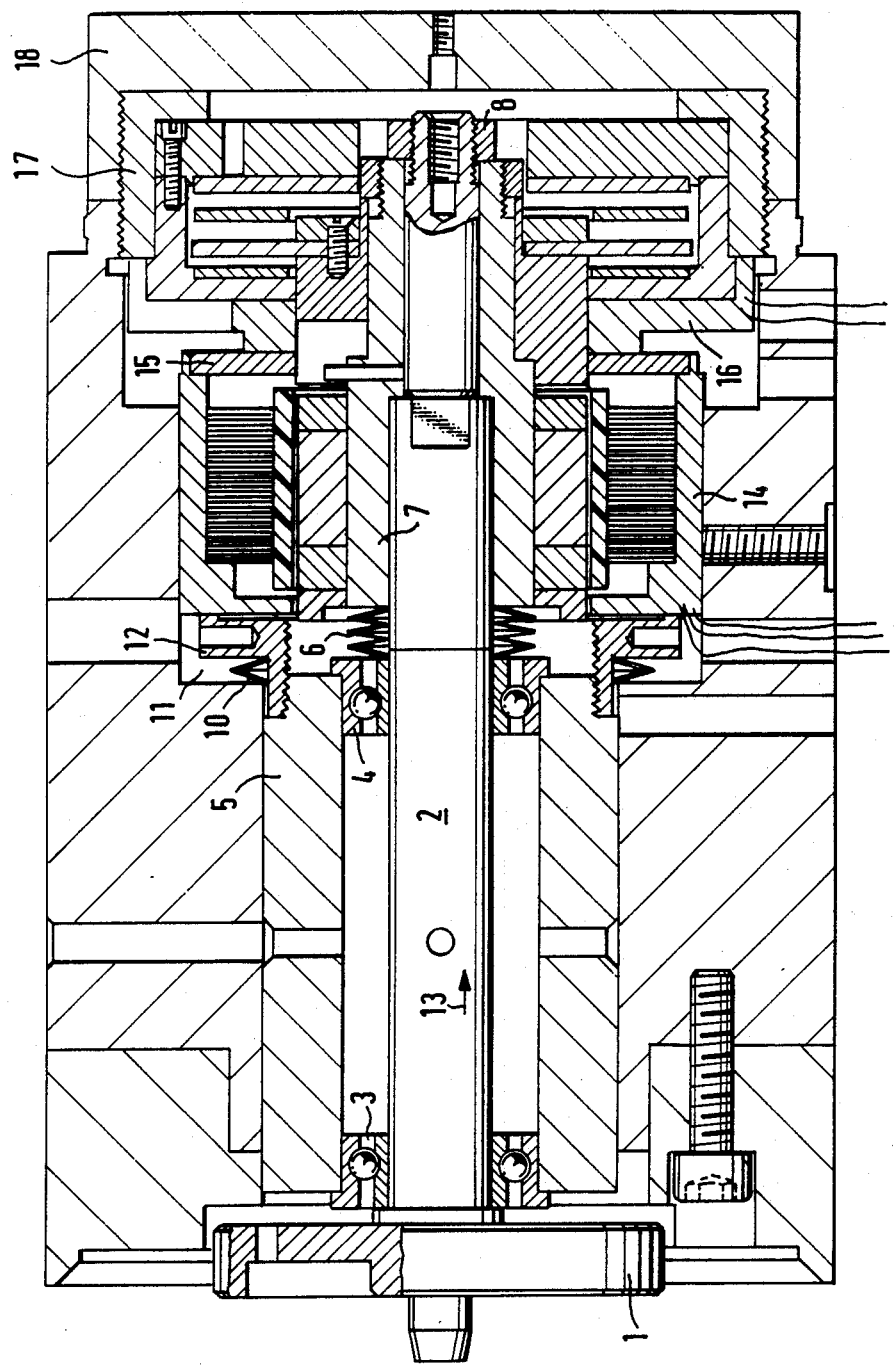

MAGNETIC SCANNING DEVICE FOR AN OBLIQUE-TRACK TAPE DECK

Cross-reference to related patents, the disclosures of which are incorporated by reference:
TAKAHASHI/JVC (U.S. Pat. No. 4,564,876 and DE-OS 32 44 215)
MAXEY/BOSCH (U.S. Pat. No. 3,516,146 and DE-OS 19 30 779)
CHENEY/AMPEX (U.S. Pat. No. 3,179,909)
SCHMIDT/GRUNDIG (U.S. Pat. No. 3,995,317)
SCHULEIN/GRUNDIG (DE-OS 31 30 801)

The present invention relates generally to tape heads for oblique-track tape recorders, and more particularly to adjustment of head position to assure that different machines will properly follow the tracks on a particular tape.

BACKGROUND

In oblique-track tape decks, it is necessary that the recorded track be laid down precisely on the magnetic tape, so that magnetic tapes played on various machines of the same system provide the same reproduction. One criterion for this is the distance of video tracks from an edge of the tape used as a reference edge. For precise adjustment of this distance, the head wheel height must be adjustable to within precise tolerances upon initial assembly and upon every replacement of the head wheel.

SCHULEIN/GRUNDIG (German Patent Disclosure Document DE-OS 31 30 801) discloses how to avoid tedious mechanical adjustment of the head wheel height by electrical adjustment, namely adjusting the phase difference between head wheel tachometer pulses and specified image pulses. This method has, however, the disadvantage that, due to the possible shifting of the sampling interval in the circumferential direction of the sampling or scanning device, the mechanical looping of the magnetic tape about the sampling device must be chosen greater than is theoretically necessary. This results in the storage surface on the magnetic tape being generally poorly used.

TAKAHASHI/JVC (U.S. Pat. No. 4,564,876 and German Patent Disclosure Document DE-OS 32 44 215) discloses how to axially slide the head wheel of a rotating magnetic head device to facilitate proper tracking. However, this relates to the shifting of the head wheel in operation, and not to the precise adjustment of the head wheel height in initial or starting condition. Furthermore, in conventional rotating magnetic head devices, the biassing pressure on or among the ball bearings changes, in correspondence with the axial position of the head wheel.

THE INVENTION

It is an object of the present invention to provide a playback device for a oblique-track tape deck, in which the head wheel height can be mechanically set exactly for compatibility without adversely affecting the biassing pressure on the head wheel bearings and without the necessity to select, in view of the head wheel height adjustment, a larger mechanical looping of the magnetic tape about the playback device than is actually necessary for trouble-free playback.

Briefly, this is accomplished by the features recited in the characterizing clause of the main claim.

The playback device of the present invention has the advantage that the head wheel height can be precisely adjusted to within very close tolerances.

A further advantage is that the biassing or pre-tensioning of the ball bearings does not change during the course of the adjustment process.

The features set forth in the dependent claims make possible further extensions and improvements of the scanning device set forth in the main claim. A particular advantage is that the angular extent of looping of the magnetic tape about the playback device is not adversely affected by the head wheel height adjustment mechanism.

DRAWING

An exemplary embodiment of the invention is illustrated in the drawing and further detailed in the following description.

The FIGURE shows a playback device of an oblique-track tape deck in cross-section (without the head wheel).

DETAILED DESCRIPTION

The playback device shown, when operating, is partially helically encircled by a magnetic tape (not shown) which, depending upon the standard chosen, subtends an angle of between 90° and somewhat less than 360°. A playback device with two magnetic heads and a magnetic tape looping of somewhat more than 180° is known from, among others, the MAXEY/BOSCH reference (U.S. Pat. No. 3,516,146=DE-OS 19 30 779).

The playback device of the invention, of which only the lower drum is shown, has a cylindrical outer diameter which is only a little smaller than the orbit of the magnetic heads at the rim of the head wheel (not shown). For seating of the head wheel, a support plate 1 is provided on the free end of an axle 2, which in turn is rotatably supported on rolling contact bearings 3, 4. The rolling contact bearings 3,4 are biassed or pre-tensioned by a cup spring assembly 6 and a pressure sleeve 7 which is held by a threaded nut 8 on a thread at the other free end of axle 2.

A further cup spring assembly 10, between a step or shoulder 11 of the inner annular surface of the playback device and a counter-ring 12, screwed to bearing unit 5, continuously pre-tensions the bearing unit 5, including the rolling contact bearings 3,4, axle 2 and support plate 1 in the direction of arrow 13. The counter-ring 12 is connected to a stator 14 of the head wheel motor. The stator is supported by a disk 15, a pressure bell 16 and a cap or ring nut 17. All elements 10, 12, 14, 15 and 16 together define a drill train. The bearing unit 5 can be finely adjusted along the fine thread on the outside of ring nut 17, using disk 15, the pressure bell 16, and the stator 14. Upon conclusion of the adjustment process, the ring nut 17 is secured by the counter ring nut 18.

The pre-tensioning of the bearings 3,4, biassed by the cup spring assembly 6 does not vary over the complete or full range of shifting of the bearing unit 5, including its head wheel drive motor.

In order to achieve a uniform coefficient of friction, the interstitial space between bearing unit 5 and the inner surface of the playback device is filled with lubricant which is stable at high temperature.

The playback device of the present invention is distinguished by the fact that the axial shifting of the head wheel and head wheel axle also adjusts the stator of the drive motor by the same amount, so that the alignment of the rotor and stator of the drive motor is maintained, thereby maintaining the highest possible efficiency and the least waste heat generation.

We claim:

1. Playback device for an oblique-track magnetic tape desk having a rotor portion (1, 2) and a stator portion (14), including
   a rotatable head wheel axle (2) defining an axis of rotation;
   a bearing unit (5) supporting said head wheel axle (2) by applying thereto predetermined radial pressure vectors tending to maintain a constant orientation of said axis of rotation;
   a head wheel support plate (1) mounted on said axle (2) for rotation therewith; and
   a means for axial adjustment, along said axis of rotation, of said head wheel axle (2) in said tape deck,
   wherein, in order to adjust a height, defined along said axis of rotation, at which said head wheel support plate (1) rotates, while maintaining said predetermined radial pressure vectors substantially constant,
   said axle (2) is supported in the bearing unit (5) under biassing or pre-tensioning by a plurality of rolling contact bearings (3,4) and
   means (10, 12, 15, 16) are provided for axially adjusting, along said axis of rotation, height of the bearing unit (5) with respect to said tape deck stator portion (14) by a corresponding amount, thereby maintaining axial alignment of said axle and said bearing unit and essentially constant radial pressure vectors therebetween.

2. Playback device according to claim 1, wherein a spring device (6) is provided, supplying biassing force to said bearings (3,4), said spring device being supported against an element (7) rotating with said head wheel axle (2).

3. Playback device according to claim 1, wherein a drive train (10,12,14,15,16) is provided for axial height adjustment of the bearing unit (5), coupled at one end to said bearing unit (5) and on another end to an adjustment device (17).

4. Playback device according to claim 3, wherein a securing device (18) secures said adjustment device (17) against rotation.

5. Playback device according to claim 4, wherein said adjustment device (17) comprises a threaded ring nut adapted for rotation in said tape deck, to thereby axially displace said stator portion (14,16).

6. Playback device according to claim 5, wherein said securing device (18) comprises a threaded counter nut adapted to screw onto said ring nut and to bear against an axial stop forming a stationary part of the tape deck.

* * * * *